United States Patent Office 3,344,180
Patented Sept. 26, 1967

---

3,344,180
NOVEL THIOCARBOXAMIDE
Martin A. Davis, Montreal, Quebec, and David J. Campbell, Pincourt, Quebec, Canada, assignors to American Home Products Corporation, New York, N.Y., a corporation of Delaware
No Drawing. Filed May 23, 1966, Ser. No. 551,939
1 Claim. (Cl. 260—551)

This invention relates to a novel chemical compound with useful biological activities.

More particularly, this invention relates to the compound 10,11-dihydro-5H-dibenzo[a,d]cycloheptene-5-thiocarboxamide represented by the Formula I:

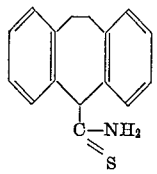

This compound 10,11-dihydro-5H-dibenzo[a,d]cycloheptene-5-thiocarboxamide may be prepared from 10,11-dihydro-5H-dibenzo[a,d]cycloheptene-5-carbonitrile (II) following a general procedure described by E. G. Kornfeld, in J. Org. Chem., 16, 131 (1951) for the preparation of 2,2-diphenylthioacetamide. Accordingly, a mixture of the carbonitrile of Formula II and ethanol is saturated with gaseous ammonia and hydrogen sulfide. The mixture is then heated in a closed vessel at an elevated temperature to give the desired thiocarboxamide which is isolated by precipitation with water and purified by crystallization. Alternatively, the thiocarboxamide (I) may be obtained from the carbonitrile (II) by treatment with thioacetamide in dimethylformamide which has been saturated with gaseous hydrogen chloride. This general method, described by E. C. Taylor et al. in J. Amer. Chem. Soc., 82, 2656 (1960) is convenient in that it obviates the need for high-pressure equipment. The reactions may be summarized in the following flow sheet:

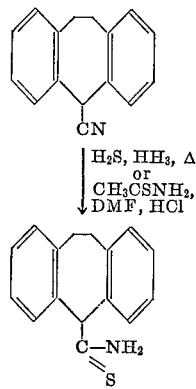

The novel compound of this invention has important biological properties and is valuable as a medicament. More particularly, the thiocarboxamide of Formula I possesses antiparasitic activities, being active against *Graphidium strigosum*, and having larvicidal actions on horse strongyles. This fact must indeed be regarded as surprising because the corresponding oxygen analog, 10,11 - dihydro - 5H - dibenzo[a,d]-cyclohepten-5-carboxamide, is totally devoid of such activities.

The compound may be used to decontaminate premises or pastures which have been infected with horse strongyles or other members of the Strongylidae family, for example, hookworms, Trichostrongylidae or Metastrongylidae. For this purpose the compound may be formulated either as suspension or solution in an aqueous vehicle, optionally containing an organic co-solvent, such as, for example, a lower alkanol. The amount of active ingredient present may be within the range of from 0.01 to 0.001 mole per litre.

In addition to the abovementioned properties the compound of this invention also has antibacterial and trichomonicidal activities. It is furthermore a valuable intermediate for the preparation of pharmacologically active thiazoles and thiazolidinones which may be obtained therefrom by reacting it with an α-halo-carbonyl compound, preferably an α-halo carboxylic acid ester or an α-halo-ketone; and for the preparation of pharmacologically active thioiminoesters, which are obtained therefrom by reacting it with a suitable organic halide.

The following descriptive example will serve to illustrate my invention but is not to be construed as limiting it thereto.

EXAMPLE 1

*10,11-dihydro-5H-dibenzo[a,d]cycloheptene-5-thiocarboxamide (III)*

(a): A mixture of 10,11-dihydro-5H-dibenzo[a,d]cycloheptene-5-carbonitrile (II), (13.1 g., 0.06 mole) and absolute ethanol (100 ml.) is saturated with ammonia and hydrogen sulfide. The mixture is heated in an autoclave at 155° for 8 hours, cooled, and poured into water (300 ml.). The precipitate is filtered off, dried and recrystallized from acetonitrile yielding the title compound as yellow prisms, M.P. 193–194° C. Elemental analysis confirms the empirical formula $C_{16}H_{15}NS$.

(b): Dry dimethylformamide (250 ml.) is saturated with gaseous hydrogen chloride. Thioacetamide (37.6 g., 0.5 mole) and the carbonitrile (II), (54.8 g., 0.25 mole) are added and the yellow solution is heated on an oil bath at 120–130° for 2 hours; a slow stream of nitrogen is passed through during this time. Part of the solvent is then removed in vacuo, water (300 ml.) is added and the mixture is neutralized by the addition of sodium bicarbonate. The precipitate is filtered off and dried to yield the title compound as above, M.P. 191–195° C.

We claim:

10,11 - dihydro - 5H-dibenzo[a,d]cycloheptene-5-thiocarboxamide.

References Cited

FOREIGN PATENTS 1,355,829   3/1964   France.

JOHN D. RANDOLPH, *Primary Examiner.*

H. MOATZ, *Assistant Examiner.*